United States Patent [19]

Speece

[11] Patent Number: 5,054,378

[45] Date of Patent: Oct. 8, 1991

[54] COMBINATION COMMUTER VAN AND AIR CONDITIONER SYSTEM THEREFOR

[76] Inventor: Donald R. Speece, 5317 Via Ramon, Yorba Linda, Calif. 92686

[21] Appl. No.: 556,040

[22] Filed: Jul. 20, 1990

[51] Int. Cl.⁵ .............................................. B60H 1/26
[52] U.S. Cl. ...................................... 98/2.15; 62/244
[58] Field of Search ................... 62/244; 98/2.11, 2.15

[56] References Cited

U.S. PATENT DOCUMENTS

| | | | |
|---|---|---|---|
| 2,714,808 | 8/1955 | Owen et al. | 98/2.11 X |
| 2,779,162 | 1/1957 | Baker et al. | 98/2.15 X |
| 2,779,164 | 1/1957 | Doane | 62/6 |
| 2,804,756 | 9/1957 | Faulhaber et al. | 62/117.1 |
| 3,329,077 | 7/1967 | Grosso | 98/2 |
| 3,906,740 | 9/1975 | Thomas | 62/239 |
| 4,432,213 | 2/1984 | Katahira et al. | 62/239 |
| 4,724,748 | 2/1988 | Geyer | 98/2.03 |

FOREIGN PATENT DOCUMENTS 167558   4/1956   Australia ............................... 165/43

*Primary Examiner*—Harold Joyce
*Attorney, Agent, or Firm*—Poms, Smith, Lande & Rose

[57] ABSTRACT

A combination commuter van and air conditioning system in which there is highly balanced air flow into the passenger compartment, and in which the combination of the air conditioning system with the van may be made rapidly and economically. A blower and cooling unit is located entirely beneath the van to the rear of the gas tank, and is centered at the central longitudinal vertical plane of the van. Cooled air is discharged from such unit and flows in opposite directions to the sides of the van. It then flows through molded transition elements which extend vertically into and through the van floor, which elements connect to horizontally-extending molded air conduits that are secured in the upper longitudinal corners of the passenger compartment. A totally balanced air flow is thus achieved, without intruding to any substantial extend into the passenger compartment of the van.

15 Claims, 3 Drawing Sheets

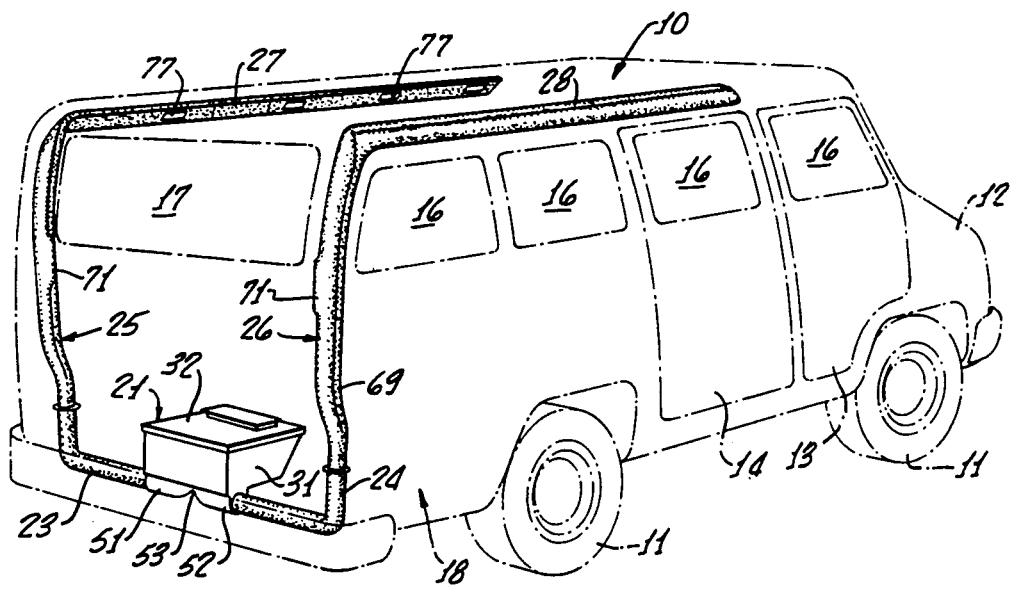
FIG. 1.
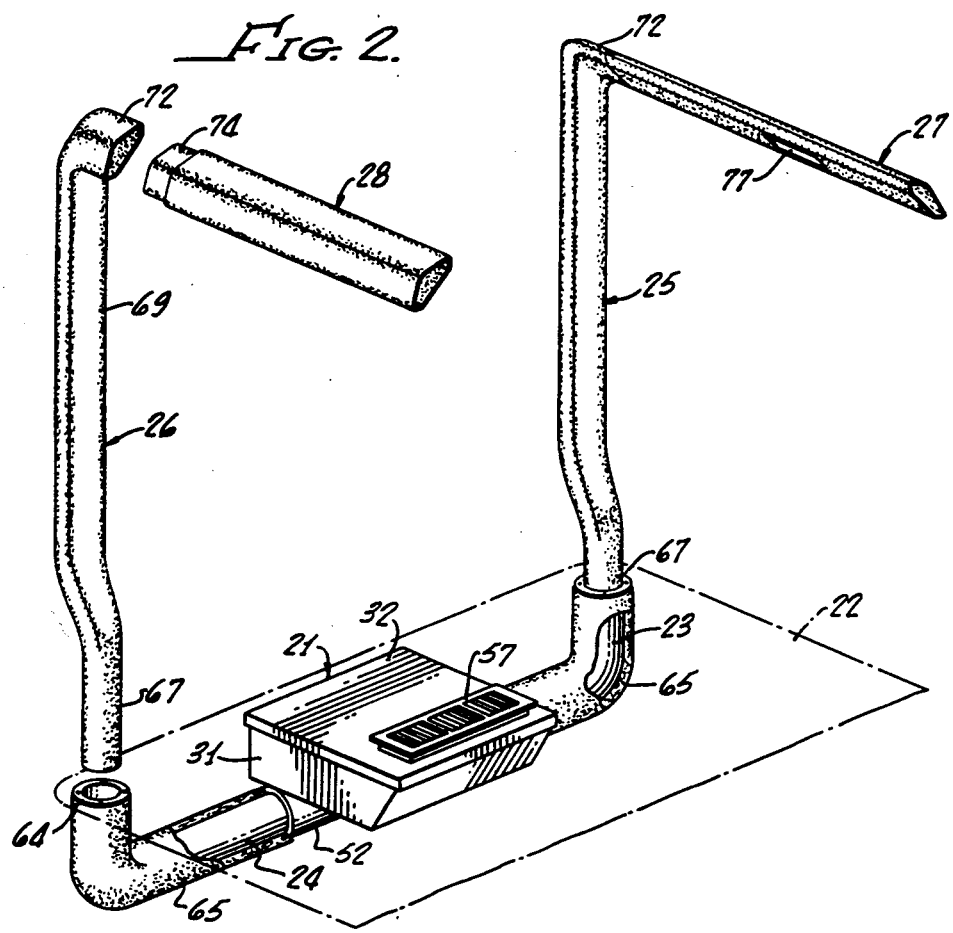

COMBINATION COMMUTER VAN AND AIR CONDITIONER SYSTEM THEREFOR

BACKGROUND OF THE INVENTION

It has for decades been known to employ exposed cool-air conduits in the passenger compartments of motor vehicles. These fed air-conditioned air to the passenger compartments from conditioning units located, at least in large part, in the vehicle itself. For example, the conditioning unit would be located in the trunk of an automobile, in the luggage compartment of a van, or to one side of the van adjacent one of the seats therein.

It has been know for many years to have commuter vans, these being stretched out vans adapted to carry larger numbers of passengers than do more conventional vans. Some companies stretching their vans have done so without simultaneously elongating the wheel base of the van. Thus, the stretched-out portion is to the rear of the gas tank, thus generating a substantial amount of unused dead space between the gas tank and the rear bumper. At the same time, these same vans were being air conditioned in a highly inadequate manner, year after year, as by heat exchangers and expansion valves located at the front portion of the vehicle so that cooled air was introduced at the front, as in a passenger automobile, and often in unbalanced manner.

SUMMARY OF THE INVENTION

The present combination commuter van and air conditioning system provides, in its preferred embodiment, a 100% balanced air flow to both sides of the vehicle. Furthermore, there is no substantial intrusion of components into the passenger compartment of the commuter van. In addition, blower noise is kept outside the vehicle. These and other advantages are achieved by combining the air conditioner system with the commuter van in a certain way, which combination can be achieved very rapidly and economically relative to either existing commuter vans or those in the process of being manufactured.

The combination comprises, in addition to the van itself, a housing that is secured beneath the floor of the overhanging portion of the van, to the rear of the gas tank and rear wheels, and forwardly of the rear bumper. Preferably, such housing is centered so that its center is in the longitudinal vertical central plane of the van. The housing contains an insulation unit in which a heat exchanger is located, is being in circuit with hoses that extend forwardly beneath the van to the engine compartment and the air conditioner compressor and condenser therein. The housing also contains balanced blower units that draw cooled air from the heat exchanger and discharge it uniformly into elbows that extend from the housing toward both sides of the van.

Vertical transition elements connect sealingly to those portions of the elbows that are located adjacent the van floor, and these transition elements extend upwardly in the respective vertical rear corner portions of the van passenger compartment. At their upper ends, the transition elements connect to longitudinal conduits that are secured in the van corners that extend forwardly adjacent each side wall. Thus, cooled air that is received in balanced manner in both such conduits may be and is discharged through spaced vent openings.

BRIEF DESCRIPTION OF THE DRAWINGS

FIG. 1 is a perspective view of the combination commuter van and air conditioning system, the van being shown in phantom lines so that the components of the systems may be illustrated therein;

FIG. 2 is a fragmentary view showing the housing for the heat exchanger as well as the blower elements, and also showing the elbows beneath the van floor, the transition elements, and the horizontal conduits;

DETAILED DESCRIPTION OF THE PREFERRED EMBODIMENT

Figure 3:
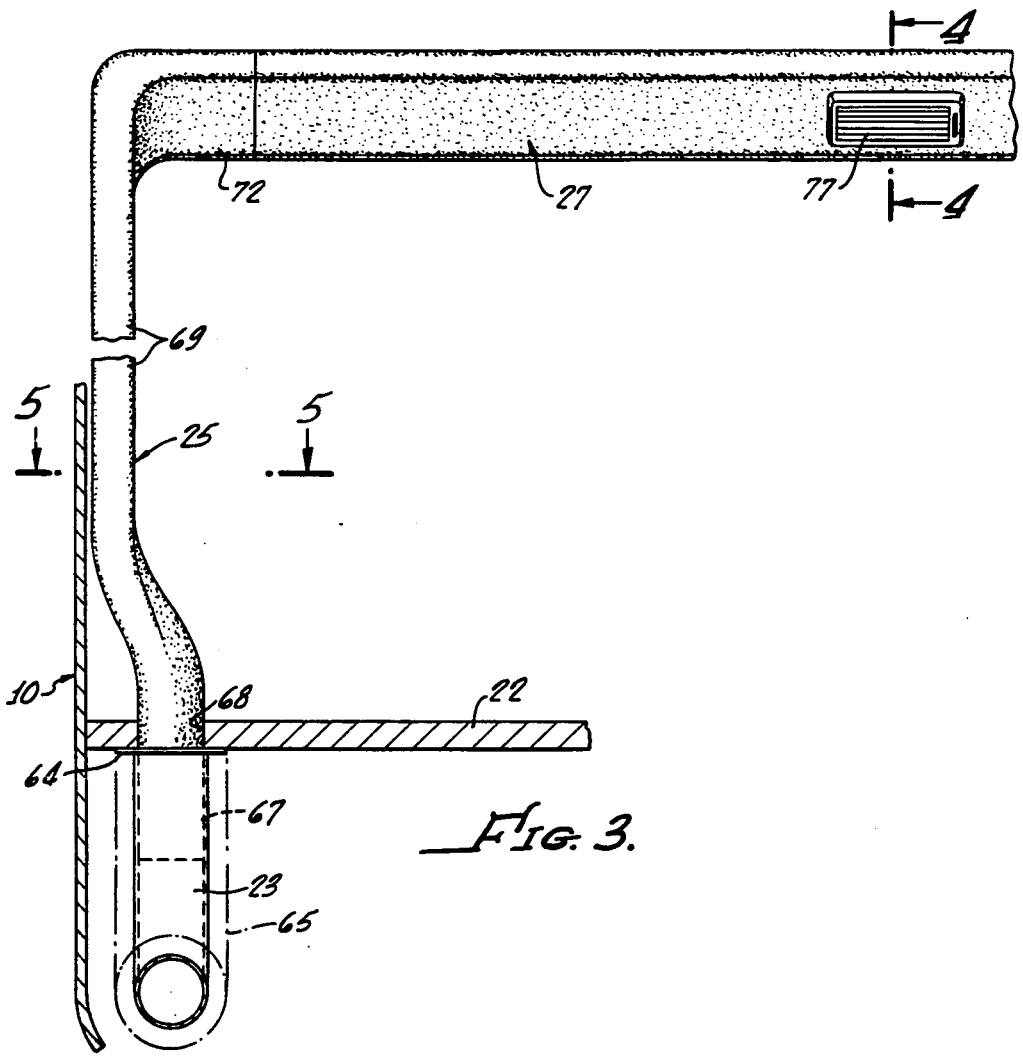
FIG. 3 is a fragmentary vertical sectional view showing the horizontal portion of one of the elbows in section, and showing a transition element and a portion of one of the horizontal conduits in side elevation.

Referring first to FIG. 1, there is shown a commuter van 10 having wheels 11, an engine compartment 12, doors 13, 14, side windows 16, and rear window 17. It is to be understood that the side of the van not shown in FIG. 1 is substantially a mirror image of the side shown, except for the doors.

Figure 7:
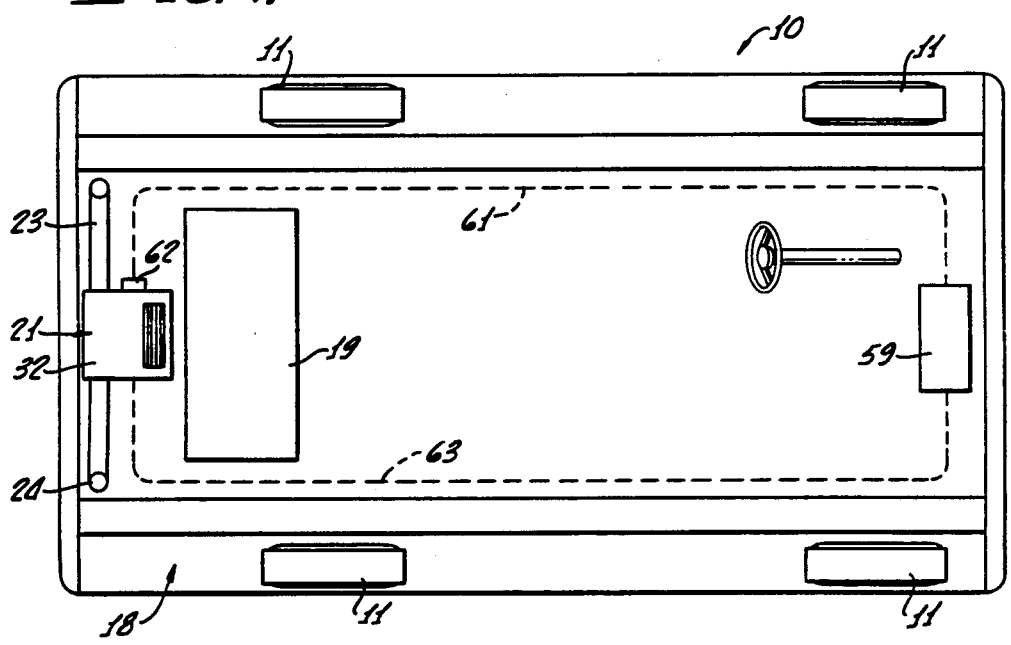
FIG. 7 is a schematic horizontal view of the van, illustrating the location of the housing.

The illustrated van is one of the type in which the wheel base of the forward and rear wheels 11 is relatively short in comparison to the length of the passenger compartment of the van. Thus, there is a rearwardly-extending portion 18 behind the rear wheels. A part of this rearwardly-extending portion 18 is behind the fuel tank 19, as shown in FIG. 7. Examples of this type of commuter van are Dodge Model B350, and Ford Model E250.

In accordance with one aspect of the present invention, there is combined with commuter van 10 an air conditioning system comprising an evaporator, expansion valve and blower unit 21 (FIGS. 1, 2 and 6) that is mounted beneath the floor 22 (FIG. 2) of the rearwardly-extending portion 18 of the van, to the rear of the rear wheels 11 and of the fuel tank 19. Very preferably, the unit 21 is disposed in the center of the van, that is to say that the center of unit 21 is in the central vertical longitudinal plane of the commuter van 10.

The air conditioning system further comprises insulated elbow 23, 24 that extend from unit 21 to side portions of the van floor 22, vertical transition elements 25, 26 respectively communicating with the elbows 23, 24, and horizontal ducts 27, 28 respectively communicating with the upper ends of vertical transition elements 25, 26.

The unit 21 will first be described, with particular references to FIGS. 1, 2 and 6. Unit 21 comprises a generally rectangular housing 31, which has vertical side and rear walls, a forwardly-upwardly inclined forward wall, and a horizontal bottom wall. Housing 31 includes a cover 32 which fits over the open top of the housing in sealed relationship. Thus, the housing 31 and its cover 32 define a chamber that it sealed against air flow except at inlet and outlet openings described below.

Housing 31 is suitably supported beneath the floor 22 of the passenger compartment of commuter van 10. Preferably, this is done by a generally U-shaped metal strap or support element 33 (FIG. 6) having horizontal flanges or ears that are provided with openings through which screws or bolts are passed in order to effect connection with the floor 22. Housing 31 and its cover 32 are immediately beneath the floor so as to leave the maximum clearance between the horizontal bottom wall of housing 31 and the pavement therebeneath. Preferably, housing 31 and cover 32 are formed of polyethylene, just as the gasoline tanks of some vans are formed of polyethylene.

Mounted in housing 31 is a molded insulating element 35 preferably formed of foam. Element 35 has a horizontal bottom wall 36 which covers substantially the entire bottom wall of housing 31, thus aiding in insulating the interior of the housing from heat transmitted thereto from the pavement. In the illustrated embodiment, the rear portion of bottom wall 36 has no insulating means above it. On the other hand, the forward portion of bottom wall 36 is integral with upwardly extending end walls 37 that are respectively disposed adjacent side walls portions of housing 31, and a horizontal top wall 38 that is adjacent the underside of cover 32. Such top wall extends between the upper ends of the end walls. There is no vertical wall at the front side of insulating element 35; thus, air may freely pass into the space defined by the end walls 37 and top wall 38 of insulating element 35, from the interior region of housing 31 that is adjacent the inclined forward wall thereof. Such space is also defined, in part, by a rear wall 43 of element 35 and which is provided for air flow purposes. Rear wall 43 concentrates the air and insures that the air flows over the heat exchanger (evaporator) that is contained within the space as next described.

A heat exchanger (evaporator) 44 is mounted in the described space, the axis of the heat exchanger being horizontal and preferably extending perpendicular to the longitudinal vertical central plane of the commuter van. The heat exchanger may be any one of various conventional elements, normally having bent or serpentine metal tubes which carry refrigerant, the tubes being in heat-exchange relationship with metal fins which increase the rate of heat exchange to air passing over the heat exchanger (evaporator).

Mounted on the rearwardly extending portion of bottom wall 36 of insulating element 35 is a blower assembly. This comprises two blowers 46, 47 in axial alignment with each other and both driven by an electric motor 48 that is disposed between the blowers as illustrated in FIG. 6. Each blower has a housing 49 the outlet portion of which is suitably mounted and sealed around an opening in the rearwardly extending portion of bottom wall 36 of the insulating element. Each such opening communicates with openings in a pipe section 51 or 52 provided beneath the bottom wall of housing 31 at the rear portion thereof as shown in FIGS. 1 and 6.

The two pipe sections 51, 52 are separated from each other by a pinched region 53 (FIG. 1), so that all air entering one pipe section 51 flows in one direction, while all air entering the other pipe section 52 flows in the opposite direction. The pipe sections 51, 52 are extended perpendicularly to the above-indicated plane. Each pipe section 51, 52 has an opening in the upper portion thereof which registers with an opening in the bottom wall of housing 31, which in turn registers with the opening means in the rear portion of bottom wall 36 of the insulating element, and thus with the outlets of the blowers 46, 47. Suitable means are provided to prevent leakage of air passing from the blowers 46, 47 into the pipe sections 51, 52. Suitable means (such as fasteners) are also provided to effect the stated connections.

Figure 6:
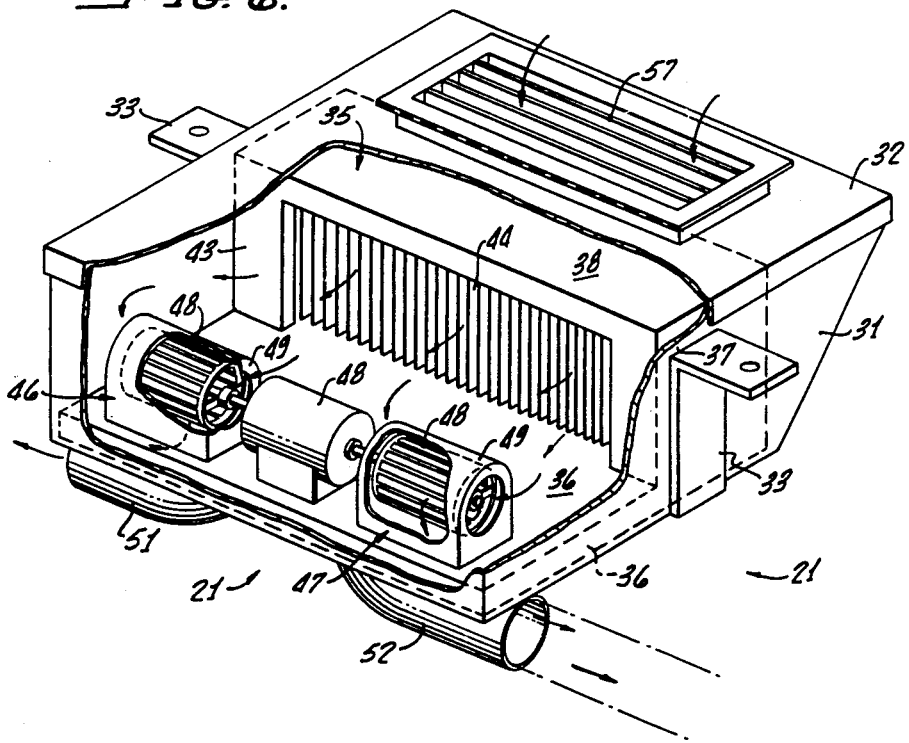
FIG. 6 is a schematic illustration of the housing and the elements therein.

Air from the passenger compartment within van 10 flows through the floor 22 of the passenger compartment, at a register 57 best shown in FIGS. 2 and 6. The air thus enters the forward portion of the sealed chamber defined by housing 31 and its cover 32. The air then flows, as indicated by arrows in FIG. 6, rearwardly through the open forward portion of insulating element 35, and then passes over the heat exchanger or evaporator 44. The thus-cooled air flows rearwardly through the opening in rear wall 43, and into the space around the housings 49 of the blowers 46, 47. The air then enters openings that are provided in each end of each blower. Squirrel-cage rotors of the blowers, and which are driven by motor 58, then pass the cooled air downwardly into the pipe sections 51, 52 through the above-described openings.

Referring next to FIG. 7, the compressor, condenser, etc., that are provided as standard equipment on the commuter van 10 are indicated schematically at 59. Refrigerant under pressure from compressor, etc., 59 passes through a hose 61 that extends to the rear of the commuter van beneath the passenger compartment. The compressed refrigerant then passes through an expansion valve indicated schematically at 62 in FIG. 7, and then passes through the pipe means in the evaporator or heat exchanger 44. The refrigerant then flows out to a second hose 63 and thus back beneath the passenger compartment to the compressor, etc., 59.

It is to be understood that suitable control means, not shown, are provided to control the refrigerant flow and the speed of blower motor 48. It is also pointed out that other conduits, not shown, are connected between the engine cooling system within engine compartment 12 (FIG. 1) (the compressor, etc., 59 also being in such compartment 12), and extend rearwardly beneath the passenger compartment to portions of the heat exchanger 44 that do not contain refrigerant. Thus, when desired, hot water is passed to the heat exchanger 44 so that the system serves as a heating system instead of cooling system.

Further Description of the Elbow, Transition and Conduit Means that Effect Fully Balanced Flow of Air from Unit 21 to the Passenger Compartment of Commuter Van 10

The above-indicated elbows 23, 24 have cylindrical horizontal portions and cylindrical vertical portions, the latter having flanges 64 at the ends thereof. The horizontal portions are so sized as to telescope into the respective pipe sections 51, 52 in snug relationship so as to prevent leakage of air. Furthermore, the flanges 64 prevent the horizontal portions of the elbows from coming out of the associated pipe sections 51, 52. This is because the flanges are secured to the underside of floor 22 as by screws or bolts. A sealing gasket, not shown, is provided between each flange 64 and the lower surface of floor 22, to insure against leakage of air to the space below floor 22.

There is provided around each elbow 23, 24 a sheath 65 of insulating material, to prevent substantial heat conduction through the walls of the elbows to the cooled air passing through the elbows.

Preferably, the elbows 23, 24, the vertical transition elements 25, 26, and the horizontal ducts 27, 28 are synthetic resin moldings.

Referring next to the transition elements 25, 26, these have cylindrical lower end portions 67 that extend through circular openings 68 in floor 22 (FIG. 3) and telescope snugly into the vertical portions of elbows 23, 24. The openings 68 are registered with the inside surfaces of elbows 23, 24 at flanges 64.

Figure 5:
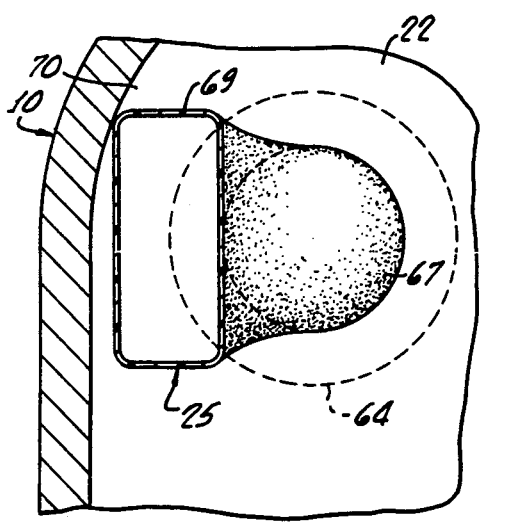
FIG. 5 is a fragmentary horizontal section on line 5—5 of FIG. 3.

The transition elements 25, 26 also have corner-located conduit portions 69 that are mounted at the vertical rear corners of the passenger compartment of the commuter van, and that extend upwardly to the ceiling of the van. One such vertical corner is indicated at 70 in FIG. 5. It is pointed out that the other corner is identical to corner 70 except for being right and left. The vertical transition elements 25, 26 are mirror images of each other, being right and left. On the other hand, the elbows 23, 24 are identical to each other and the horizontal ducts 27, 28 are identical to each other.

The transition elements 25, 26 pass on opposite sides of rear window 17 of the van, and thus do not obscure vision. The transitions are secured to the rear wall of the van by fasteners extending through protuberant portions 71 of the transition elements (FIG. 1).

Figure 4:
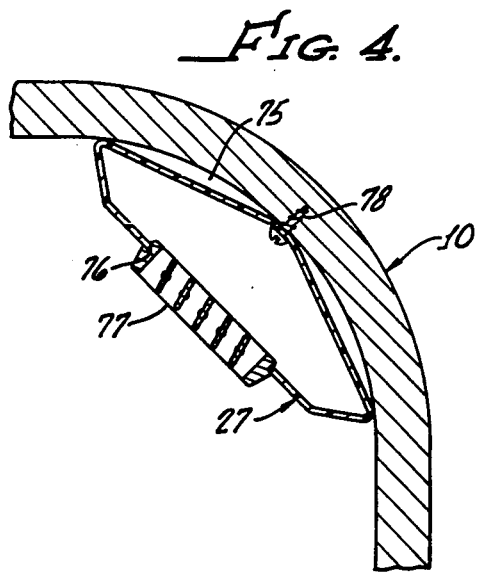
FIG. 4 is a fragmentary vertical sectional view taken on line 4—4 of FIG. 3 and also showing in vertical section an upper corner portion of the passenger compartment of the van.

The upper ends of the vertical transition elements 25, 26 bend forwardly as best shown in FIGS. 2 and 3, the bent ends being numbered 72. Such bent ends 72 have cross-sectional shapes corresponding to the cross-sectional shapes of the horizontal ducts 27, 28. Referring to FIG. 2, at the left side thereof, each duct has at its rear end portion a necked-down section 74 adapted to be lightly press fit into a bent end 72. From such necked-down portions 74, the horizontal ducts 27, 28 extend forwardly in the upper corners of the passenger compartment, one such corner being denoted 75 in FIG. 4.

At spaced points along the ducts 27, 28, there are provided openings 76 in which are mounted registers 77 (FIG. 4) so as to effectively distribute the air within the passenger compartment.

The horizontal ducts 27, 28 are secured in the corners 75, preferably by screws that are mounted prior to insertion of the registers 77 into the duct openings. One such screw is shown at 78 in FIG. 4.

It is emphasized that, very preferably, the elbows, transitions and ducts on both sides of the passenger compartment are identical to each other except for being left and right. Thus, they have identical cross-sectional shapes and sizes to thereby effect balanced flow of air into the passenger compartment.

At the forward ends of ducts 27, there are closure walls to block air flow.

The foregoing detailed description is to be clearly understood as given by way of illustration and example only, the spirit and scope of this invention being limited solely by the appended claims.

What is claimed is:

1. A combination commuter van and air conditioning unit therefor; said combination comprising:
    (a) a commuter van having an elongate body defining a passenger compartment,
    said passenger compartment having a forwardly-extending upper corner on each side thereof and extending for at least a majority of the length thereof,
    said passenger compartment having a vertically-extending corner on each side thereof at the rear of said body and outwardly of a rear window of said body, said van having rear wheels and a gas tank at the rear portion thereof,
    said commuter van body having an overhanging rear portion that extends substantially rearwardly from said rear wheels and from said gas tank,
    said overhanging rear portion having a horizontal floor which forms the rear portion of the floor of said passenger compartment,
    (b) housing means mounted beneath said floor of said overhanging rear portion of said van body,
    (c) evaporator means mounted in said housing means,
    (d) conduit and expansion valve means to expand compressed refrigerant into said evaporator means to thereby chill said evaporator means,
    (e) blower means mounted in said housing means to draw air from said passenger compartment for chilling by said evaporator means,
    (f) means to conduct said chilled air to said vertically-extending corners of said passenger compartment,
    (g) vertical conduit means provided at said vertically-extending corners to conduct said chilled air upwardly, and
    (h) horizontal conduit means connected to the upper portions of said vertical conduit means to conduct chilled air forwardly therefrom and discharge such air into said passenger compartment.

2. The invention as claimed in claim 1, in which said vertical conduit means are molded conduit elements formed of synthetic resin, each such molded conduit element defining by itself a passage for said chilled air.

3. The invention as claimed in claim 1, in which said horizontal conduit means comprises molded conduit elements formed of synthetic resin and having spaced air-outlet openings therealong.

4. The invention as claimed in claim 3, in which each of said molded conduits extends along one of said forwardly-extending upper corners.

5. The invention as claimed in claim 1, in which said horizontal conduit means comprises two separate conduit means, one of such two conduit means extending forwardly in each of said forwardly-extending upper corners of said passenger compartment.

6. The invention as claimed in claim 1, in which said means to conduct said chilled air to said vertically-extending corners of said passenger compartment comprises elbow-shaped conduits that extend from said housing means to openings in said floor of said overhanging rear portion of said van body.

7. The invention as claimed in claim 6, in which said vertical conduit means have lower portions that extend through said floor and telescope into the upper ends of said elbows.

8. The invention as claimed in claim 1, in which said housing means comprises a synthetic resin housing secured to the underside of said floor, inlet means to said housing, said inlet means extending through said floor, in which said means to conduct said chilled air to said vertically-extending corners of said passenger compartment comprises conduits extending from said housing to lower end portions of said vertical conduit means, said last-named conduits extending through said floor, and in which said housing is sealed against passage of air except through said inlet means and said last-named conduits.

9. The invention as claimed in claim 1, in which said housing means comprises a housing having a molded insulating element therein, said molded insulating element having a rearwardly extending bottom wall adjacent the bottom wall of said housing, said molded insulating element also having upwardly extending portions disposed adjacent side walls of said housing, and having an upper wall extending between upper portions of said side walls, in which said evaporator means is mounted in the space between said upwardly extending walls and below said upper wall, in which means are provided to conduct air from said passenger compartment through said floor to said housing at a region forwardly of said evaporator means, said air then flowing rearwardly beneath said upper wall and over said evaporator means to the rear portion of said housing, in which said blower means are mounted on said rearwardly extending bottom wall of said molded insulation element, said blower means drawing in air from said housing and discharging air through said rearwardly extending portion of said insulating element and through the bottom of said housing to said means to conduct said chilled air to said vertically-extending corners of said passenger compartment.

10. The invention as claimed in claim 1, in which said housing means, said means to conduct said chilled air to said vertically extending corners of said passenger compartment, said vertical conduit means and said horizontal conduit means are matched and located so as to provide substantially completely balanced flow of air from said housing means to said horizontal conduit means.

11. A combination commuter van and air conditioning unit therefor; said combination comprising:
(a) a commuter van having an elongate body defining a passenger compartment,
said passenger compartment having a forwardly-extending upper corner on each side thereof and extending for at least a majority of the length thereof,
said passenger compartment having a vertically-extending corner on each side thereof at the rear of said body and outwardly of a rear window of said body, said van having rear wheels and a gas tank at the rear portion thereof,
said commuter van body having an overhanging rear portion that extends substantially rearwardly from said rear wheels and from said gas tank,
said overhanging rear portion having a horizontal floor which forms the rear portion of the floor of said passenger compartment,
(b) a single housing mounted beneath said floor of said overhanging rear portion of said van body, said housing being substantially rectangular and being substantially sealed,
(c) air-intake means extending through said floor and into said sealed housing,
(d) an evaporator mounted in said housing,
(e) a refrigeration system comprising compressor and condenser means disposed in the engine compartment of said van, further comprising hoses extending from said compressor and condenser means beneath said van body to the vicinity of said housing, and further comprising expansion valve means to expand compressed refrigerant from one of said hoses into said evaporator means to thereby chill said evaporator means,
(f) blower means mounted in said housing means to draw air from said passenger compartment and across said evaporator means for chilling by said evaporator means,
(g) first and second elbow-shaped conduits having generally horizontal portions adapted to receive chilled air from said blower means at said housing, said elbow-shaped conduits also having vertical portions extending upwardly to said floor,
(h) vertical conduit means mounted at said vertically-extending corners to conduct said chilled air upwardly from said vertical portions of said elbow-shaped conduits, to the vicinities of said forwardly-extending upper corners, and
(i) horizontal conduit means connected to the upper portions of said vertical conduit means to conduct chilled air forwardly therefrom and to discharge said air into said passenger compartment.

12. The invention as claimed in claim 11, in which said horizontal conduit means comprise first and second conduits respectively provided in said forwardly-extending upper corner portions at the sides of said passenger compartment.

13. The invention as claimed in claim 12, in which said elbow-shaped conduits are shaped and sized identically to each other, in which said vertical conduit means are molded synthetic resin conduit elements that are identically sized and are mirror images of each other, and in which said horizontal conduits are identical molded conduit elements respectively connected to said vertical conduits at the upper ends thereof.

14. The invention as claimed in claim 13, in which said upper conduits in said corners each define, by themselves, air passages for said chilled air, said conduits being fastened in said corners by fastener means, said conduits having air-outlet registers at spaced points therealong.

15. The invention as claimed in claim 14, in which said housing has its center substantially at the vertical central longitudinal plane of said van body, and in which said vertical conduit means and said horizontal conduit means are spaced substantially equal distances from said plane to thereby provide a substantially fully balanced system.

* * * * *